(12) United States Patent
Bond

(10) Patent No.: US 8,454,720 B1
(45) Date of Patent: Jun. 4, 2013

(54) AIR CONDENSER HOUSING SCREENING APPARATUS

(76) Inventor: Richard C. Bond, Dakota Dunes, SD (US)

( * ) Notice: Subject to any disclaimer, the term of this patent is extended or adjusted under 35 U.S.C. 154(b) by 506 days.

(21) Appl. No.: 12/721,696

(22) Filed: Mar. 11, 2010

(51) Int. Cl.
*B01D 46/00* (2006.01)

(52) U.S. Cl.
USPC .............. 55/491; 55/385.1; 55/496; 55/500; 55/511; 55/525

(58) Field of Classification Search
CPC .................................. B01D 39/00; B01D 46/00
USPC .............. 55/385.1, 491–496, 500–502, 511, 55/525, DIG. 31
See application file for complete search history.

(56) References Cited

U.S. PATENT DOCUMENTS

| | | | |
|---|---|---|---|
| 4,475,585 A | 10/1984 | Hoeffken | |
| 4,961,849 A | 10/1990 | Hull et al. | |
| 5,097,678 A | 3/1992 | Aubuchon | |
| 5,131,463 A | 7/1992 | Zimmerli et al. | |
| 5,156,662 A | 10/1992 | Downing et al. | |
| 5,307,849 A | 5/1994 | Nelson | |
| 5,312,467 A | 5/1994 | Wolfe | |
| 5,342,423 A * | 8/1994 | Taft | 55/483 |
| 5,687,689 A | 11/1997 | Santos | |
| 5,689,969 A | 11/1997 | Conroy | |
| 5,809,800 A | 9/1998 | Deal | |
| 6,138,993 A | 10/2000 | Mitchell, Jr. et al. | |
| 6,186,158 B1 | 2/2001 | Goarin | |
| 6,221,120 B1 | 4/2001 | Bennington et al. | |
| 6,430,954 B1 | 8/2002 | Smith | |
| 7,140,194 B1 | 11/2006 | Miller | |
| 7,387,654 B1 * | 6/2008 | Byers | 55/385.1 |

* cited by examiner

*Primary Examiner* — Jason M Greene
*Assistant Examiner* — Karla Hawkins

(57) ABSTRACT

A air condenser housing screening apparatus includes a pair of female mating members each comprising an elongated panel having a first side and a second side. A female receiver is mounted on the first side. A pair of male mating members is provided and each is removably engageable with one of the female mating members. Each of the female mating members has one of a plurality of fasteners coupled thereto. The fasteners are configured to releasably couple the female mating members to an air condenser housing. A screen mesh is positioned between coupled pairs of the female and male mating members to cover a portion of the housing with the screen.

10 Claims, 8 Drawing Sheets

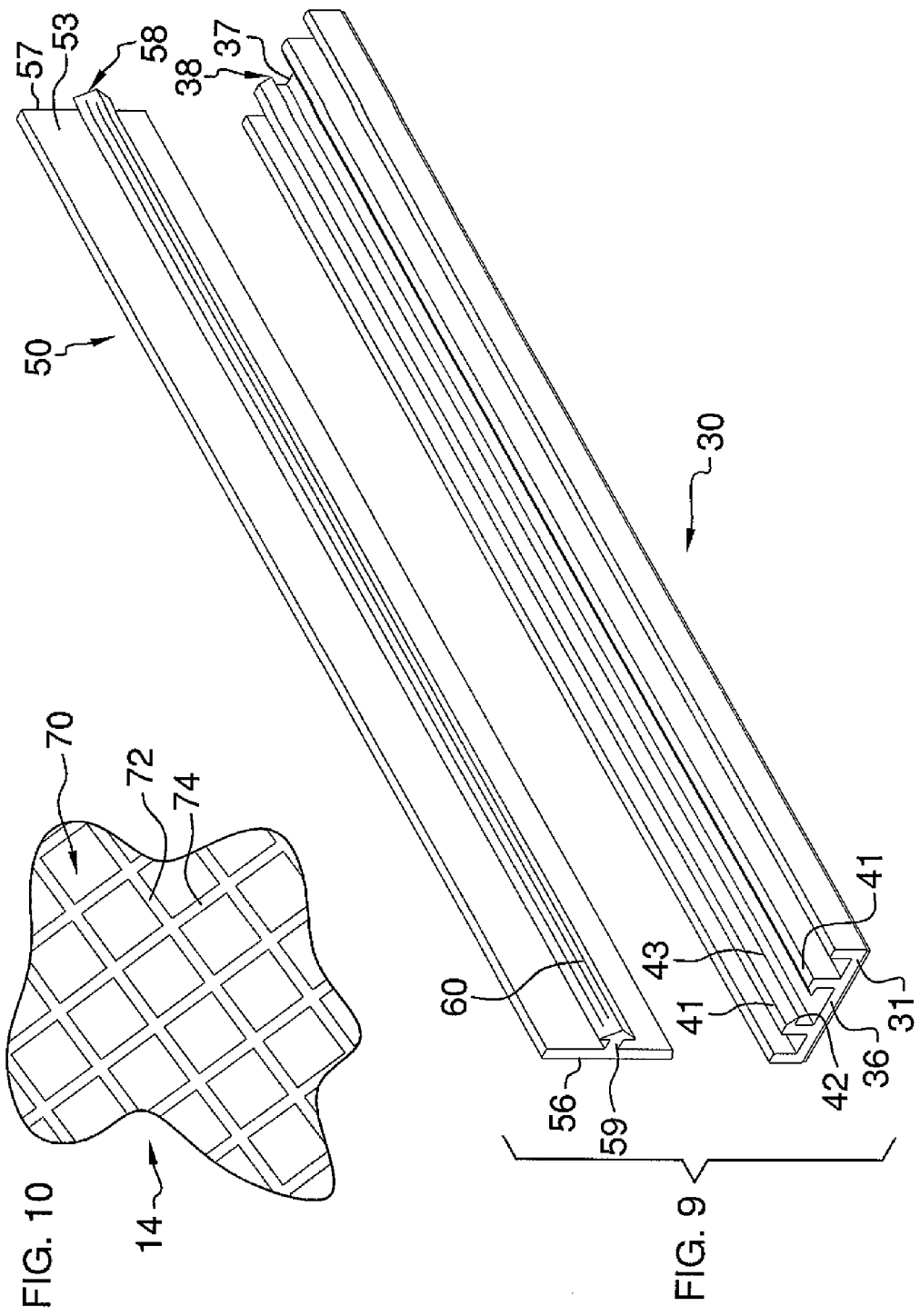

AIR CONDENSER HOUSING SCREENING APPARATUS

BACKGROUND OF THE DISCLOSURE

Field of the Disclosure

The disclosure relates to air condenser housing debris blocking devices and more particularly pertains to a new air condenser housing debris blocking device for blocking debris such as small twigs, grass clipping, leaves and other materials that would otherwise enter a air condenser housing through the vent holes thereof.

SUMMARY OF THE DISCLOSURE

An embodiment of the disclosure meets the needs presented above by generally including a pair of female mating members. Each of the female mating members comprises an elongated panel has a first side, a second side, a first side edge, a second side edge, a first end and a second end. The elongated panel is elongated from the first end to the second end. A female receiver is mounted on the first side and extends from the first end to the second end. The female receiver is spaced from each of the first and second side edges. A pair of male mating members is also provided. Each of the male mating members is removably engageable with one of the female mating members. Each of the male mating members comprises an elongated plate having an exposed surface, a hidden surface, a first lateral edge, a second lateral edge, a first terminal edge and a second terminal edge. A male coupler is mounted on the hidden surface and is removably extendable into the female receiver of one of the female mating members. Each of the female mating members has one of a plurality of fasteners coupled thereto. The fasteners are configured to releasably couple the female mating members to an air condenser housing. A screen mesh is formed by filaments intersecting each other. A plurality of openings extends through the screen, each of the openings is bounded by four filaments. The screen has a density of the openings equal to at least 140 openings per square inch of the screen. The screen has an upper edge, a lower edge, a first outer edge and a second outer edge. The screen is positioned between coupled pairs of the female and male mating members to position the first outer edge between one of the coupled pairs and position the second outer edge between another of the coupled pairs. The coupled pairs are adapted to space the screen from the housing adjacent to the coupled pairs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 9 is a perspective view male and female couplers of an embodiment of the disclosure.

FIG. 10 is a perspective view a portion of the screen of an embodiment of the disclosure.

DESCRIPTION OF THE PREFERRED EMBODIMENT

Figure 1:
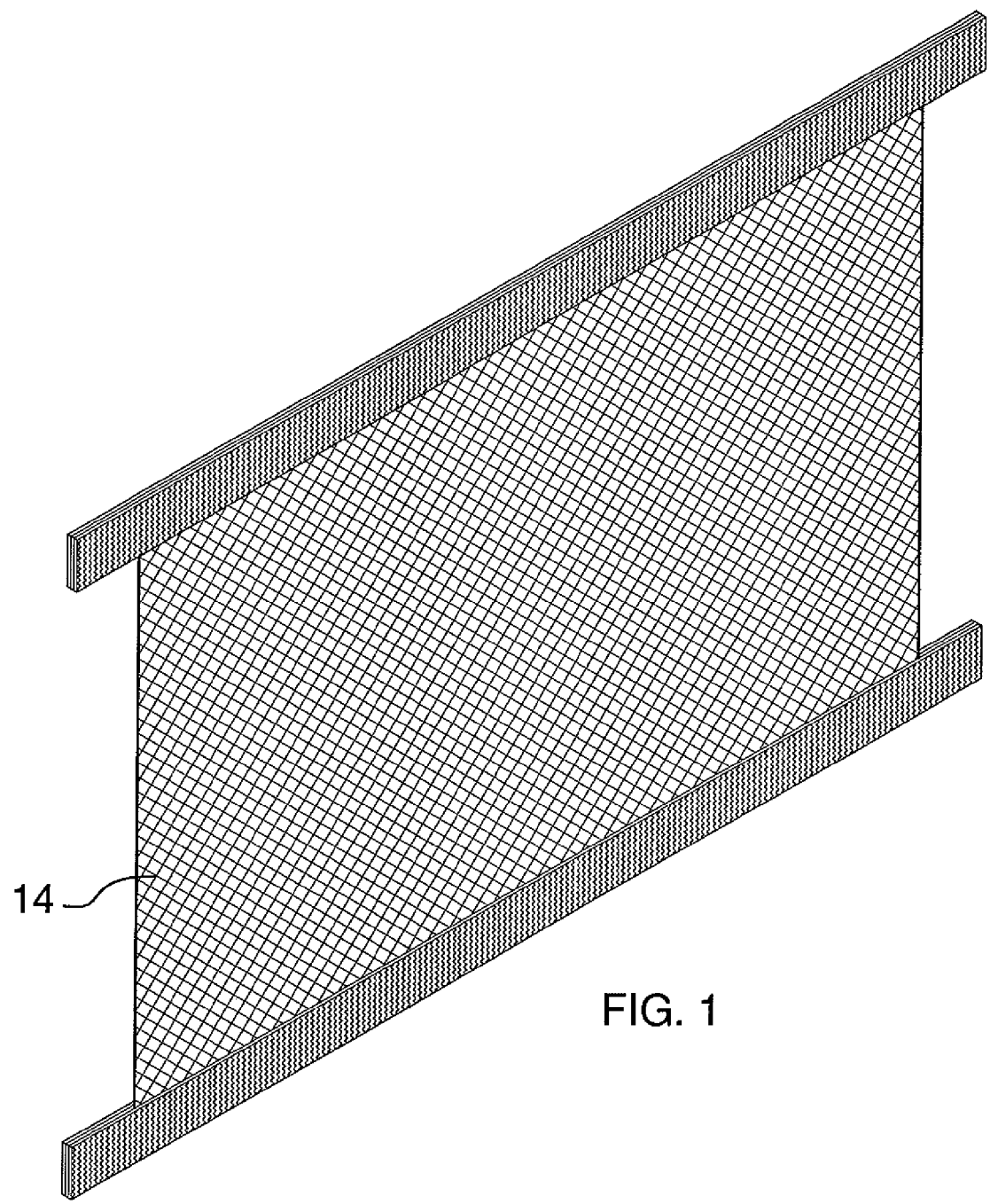
FIG. 1 is a perspective view of a screen of a air condenser housing screening apparatus according to an embodiment of the disclosure.
Figure 2:
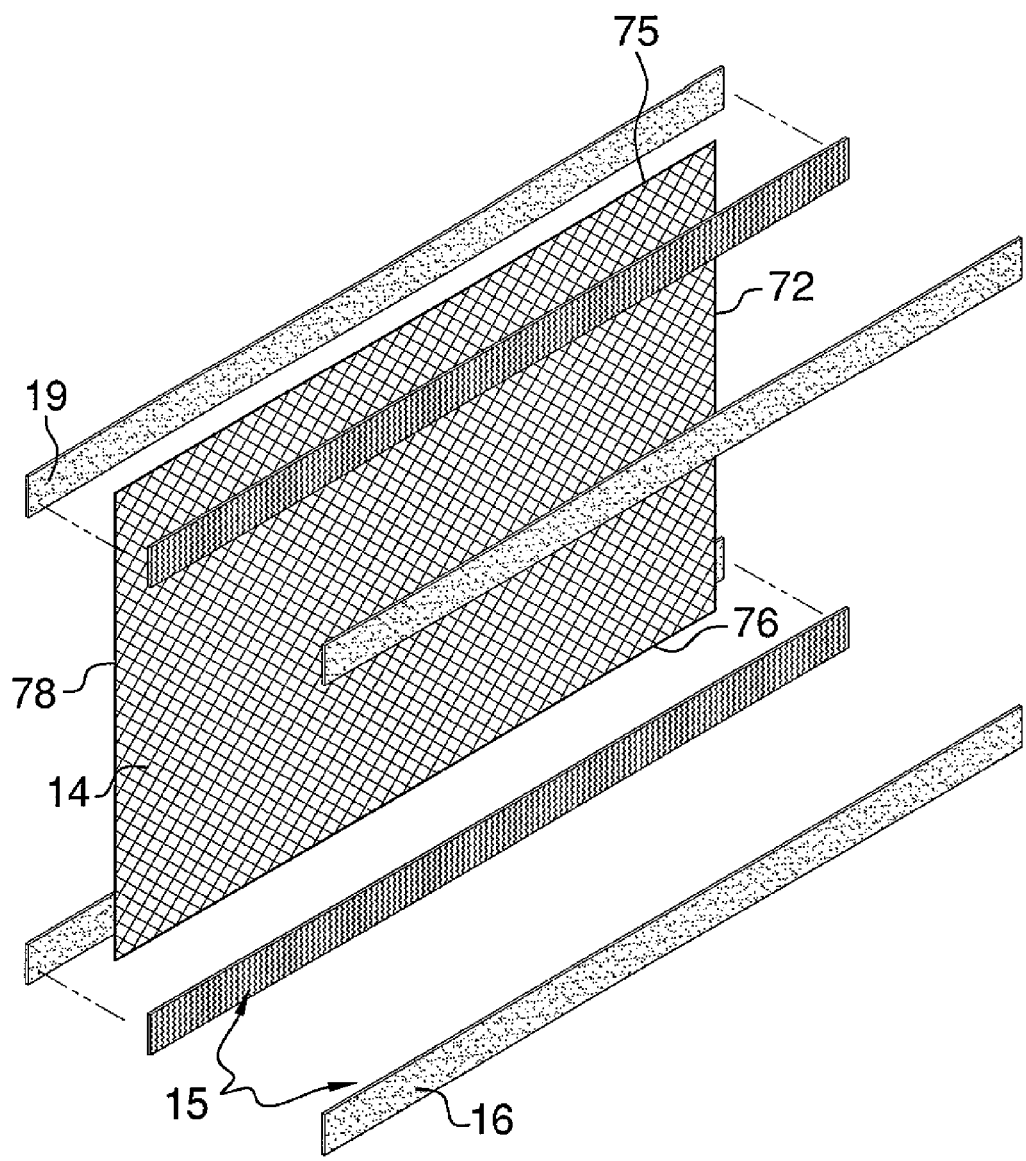
FIG. 2 is a perspective exploded view of an embodiment of the disclosure.
Figure 3:
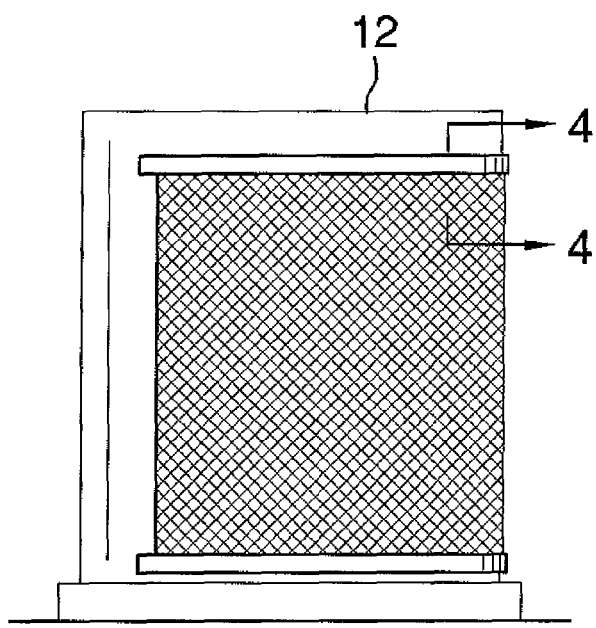
FIG. 3 is a side in-use view of an embodiment of the disclosure.
Figure 4:
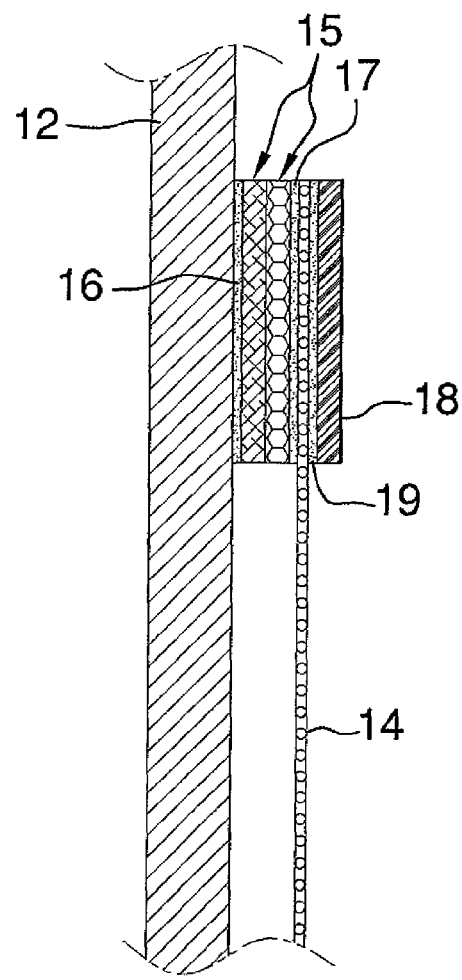
FIG. 4 is a cross-sectional view of an embodiment of the disclosure taken along line 4-4 of FIG. 3.

With reference now to the drawings, and in particular to FIGS. 1 through 10 thereof, a new air condenser housing debris blocking device embodying the principles and concepts of an embodiment of the disclosure and generally designated by the reference numeral 10 will be described.

As best illustrated in FIGS. 1 through 10, the air condenser housing screening apparatus 10 and system generally comprises a conventional air condenser housing 12 of the type used for home central air assemblies. The housing 12 includes air access openings extending therethrough typically covered by a grating member. However, the apertures in the grate often let material such as seeds, grass clippings, small leaves, large dirt particles and the like.

Figure 5:
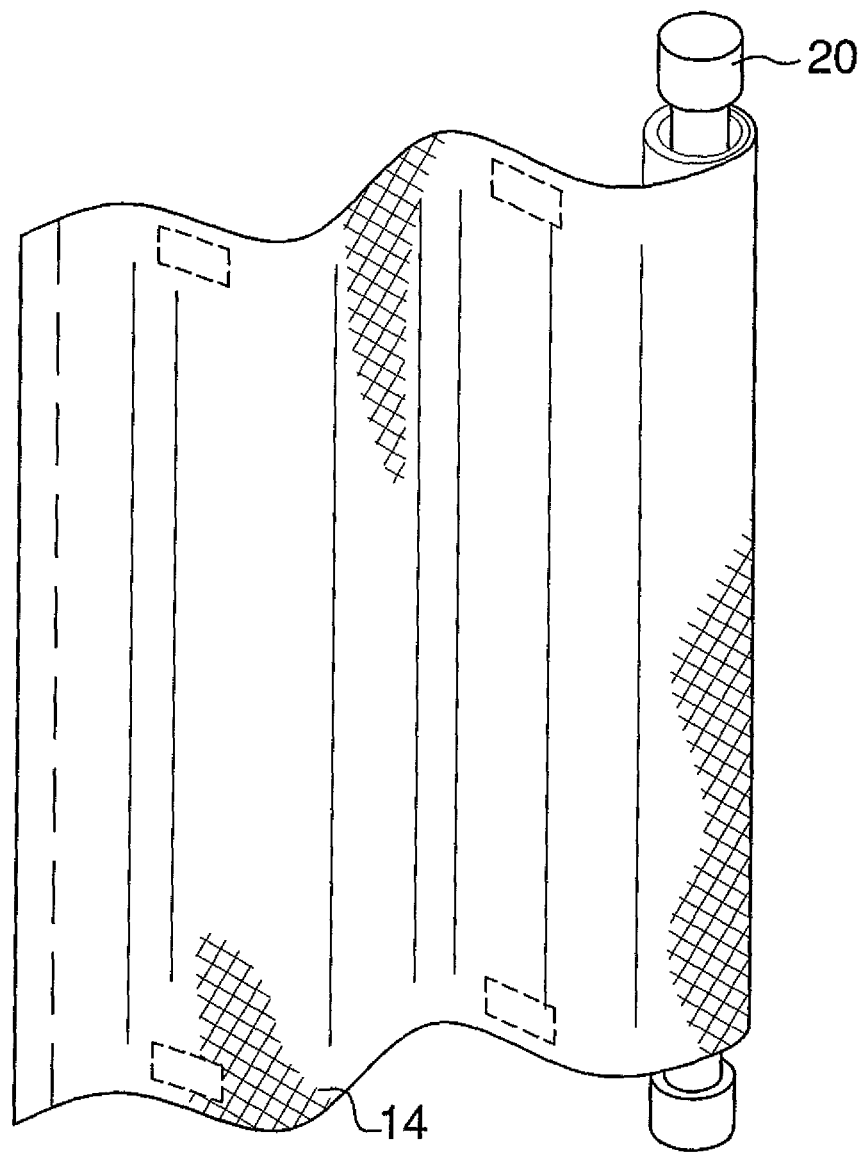
FIG. 5 is a perspective view of an embodiment of the disclosure.
Figure 6:
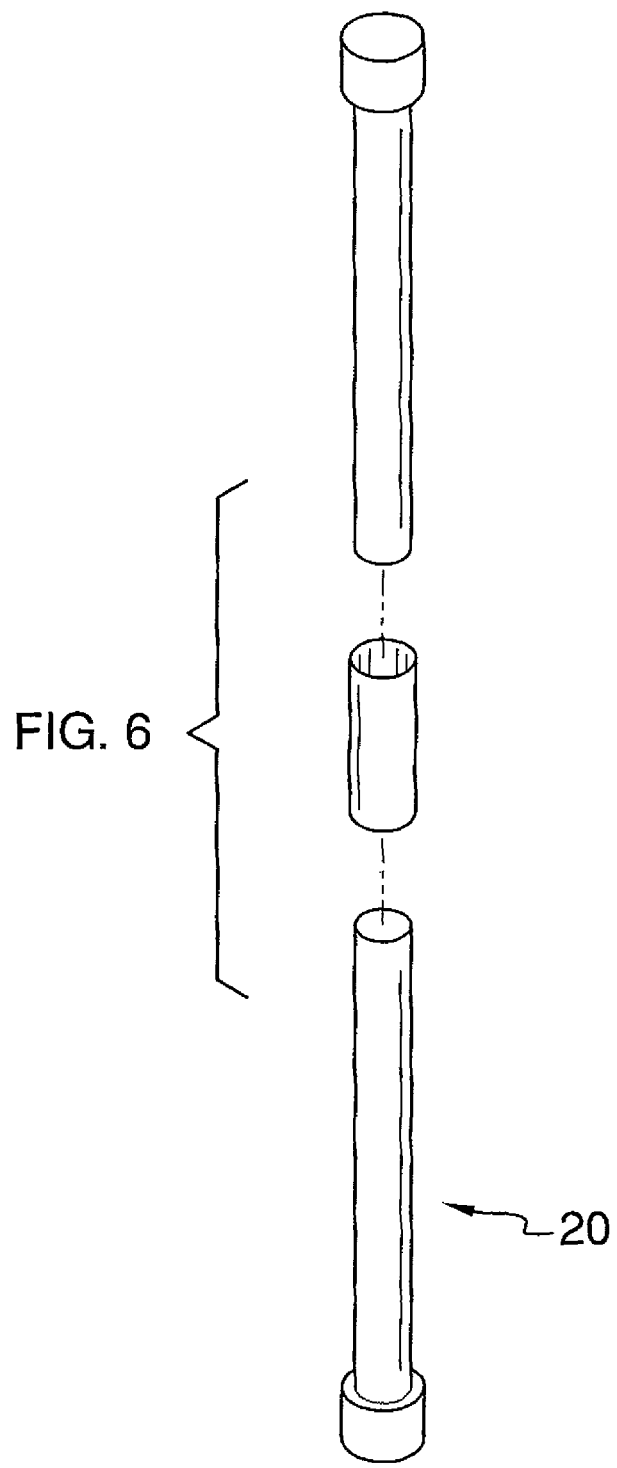
FIG. 6 is a perspective view of an embodiment of a storage and application post of the disclosure.

FIGS. 1-6 depict one embodiment utilizing a screen mesh 14 which is attached to the housing 12 by way of hook and loop fasteners 15. It has been found that it is advantageous to attach hook and loop mating members 15 directly to each other so that each has outwardly facing adhesive surfaces 16, 17. One of the surfaces 16 is attached to the housing 12 and one is attached to the screen 14. A third strip 18 also has adhesive 19 thereon which is pressed against the screen 14 to cover the hook and loop fasteners 15 and to adhere to the outer adhesive surface 17 facing away from the housing 12. This effectively retains the screen 14 in place due to the bond between the adhesives 17 and 19, and the bond between the adhesives 17 and 19 and the screen 14. FIGS. 5 and 6 depict a post 20 that may be used to wrap the screen 14 around so that it may be more easily installed.

Figure 7:
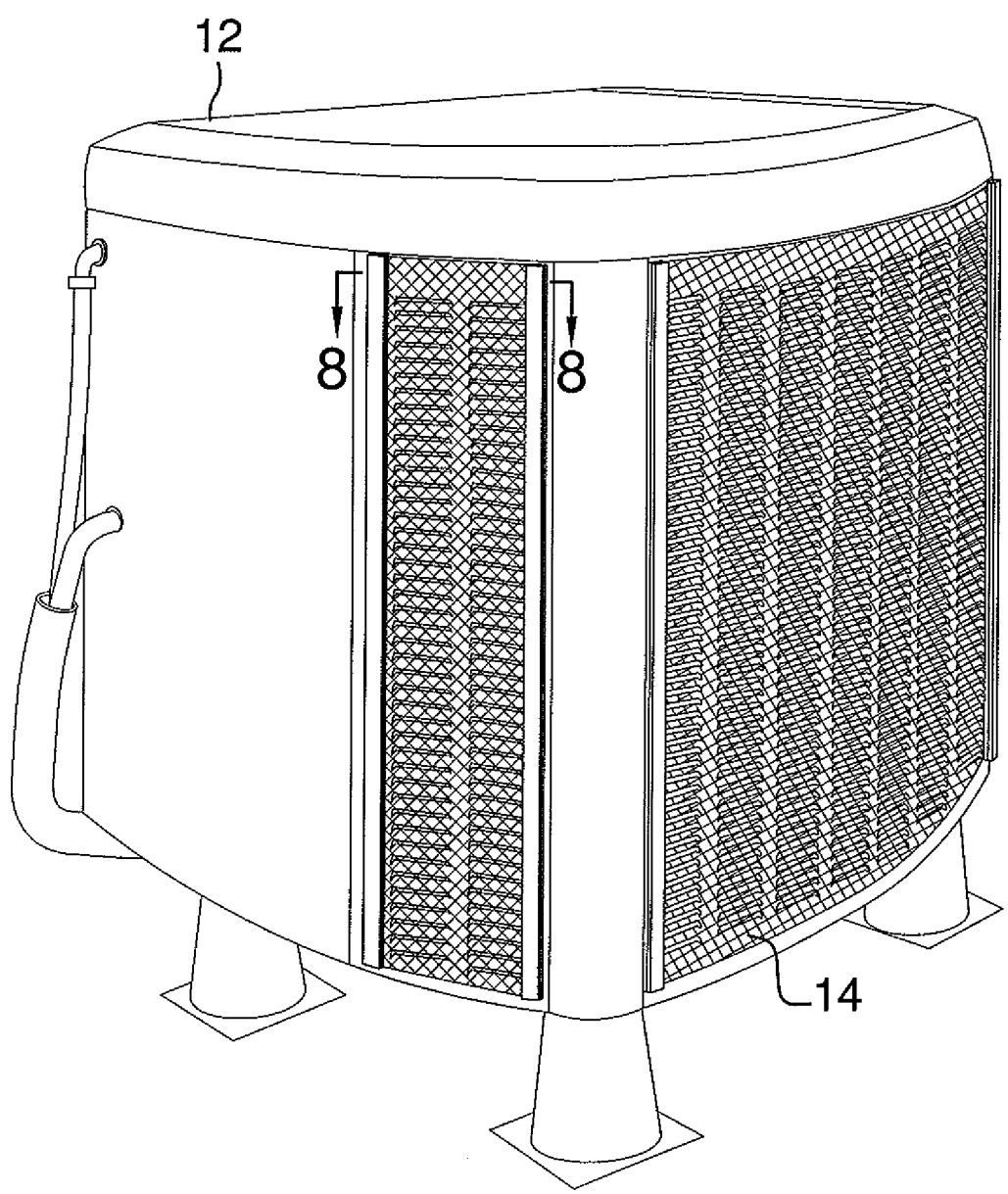
FIG. 7 is a perspective in-use view of an embodiment of the disclosure.
Figure 8:
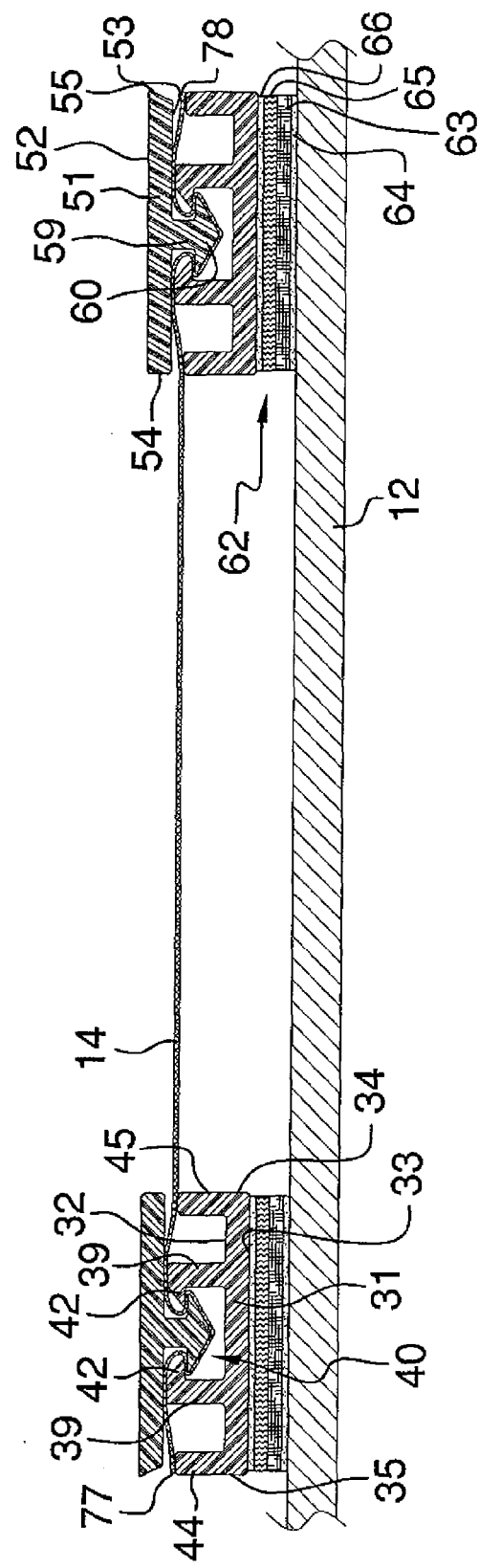
FIG. 8 is a cross-sectional view of an embodiment of the disclosure taken along line 8-8 of FIG. 7.

FIGS. 7-9 include an embodiment with male 50 and female 30 mating members. A pair of the female mating members 30 is provided. Each of the female mating members 30 comprises an elongated panel 31 that has a first side 32, a second side 33, a first side edge 34, a second side edge 35, a first end 36 and a second end 37. The elongated panel 31 is elongated from the first end 36 to the second end 37. A female receiver 38 is mounted on the first side 32 and extends from the first end 36 to the second end 37. The female receiver 38 is spaced from each of the first 34 and second 35 side edges. The female receiver 38 is formed by a pair of elongated inner walls 39 spaced from each other and spaced from the first 34 and second 35 side edges. A receiving space 40 is defined between the inner walls 39. Each of the inner walls 39 has a distal edge 41 with respect to first side 32. Each of the inner walls 39 has a flange 42 attached thereto and positioned adjacent to a corresponding one of the distal edges 41. The flanges 42 extend toward each other. The flanges 42 have an outer surface 43 facing away from the first side 32. The outer surface 42 of each of the flanges 42 is angled downwardly toward the receiving space 40. A first outer wall 44 is attached to the first side 32 and is coextensive with the first side edge 34. A second outer wall 45 is attached to the first side 32 and is coextensive with the second side edge 35. The first 44 and second 45 outer walls are orientated parallel to the inner walls 39.

A pair of the male mating members 50 is provided. Each of the male mating members 50 is removably engageable with one of the female mating members 30. Each of the male mating members 50 comprises an elongated plate 51 having an exposed surface 52, a hidden surface 53, a first lateral edge 54, a second lateral edge 55, a first terminal edge 56 and a second terminal edge 57. The plate 51 has a width from the first lateral edge 54 to the second lateral edge 55 approximately equal to a width of the panel 31 from the first side edge 34 to the second side edge 35. A male coupler 58 is mounted on the hidden surface 53 and is removably extendable into the female receiver 38 of one of the female mating members 30. The male coupler 58 includes a base 59 extending from the first terminal end 56 to the second terminal end 57. A catch 60 is attached to and extends along a length of the base 59 opposite of the plate 51. The catch 60 engages associated ones of the flanges 42 to retain the plate 51 in a coupled state with the panel 31. The catch 60 has a pyramidal shaped cross-section taken traverse to a longitudinal axis of the catch 60 and extends laterally away in opposite directions from the base 59. The catch 60 is positioned between the flanges 42 and the panel 31.

A plurality of fasteners 62 is provided. Each of the female mating members 30 has one of the fasteners 62 coupled thereto. The fasteners 62 are configured to releasably couple the female mating members 30 to the housing 12. Each of the fasteners 62 may comprise a first mating member 63 that has an adhesive 64 thereon configured to be attached to the housing 12. A second mating member 65 is adhesively coupled to an associated one of the second sides 33 with an adhesive 66. The first 63 and second 65 mating members are releasably coupled to each other. The first 63 and second 65 mating members comprise hook and loop couplers. The use of the releasable fasteners 62 allows the female mating member 30 to be more easily removed from the housing 12 than if adhesive alone were used.

The screen mesh 14 is formed by filaments 72, 74 intersecting each other. These may be woven or may be molded to form a pattern of intersecting filaments 72, 74. As such, the screen 14 may be comprised of a metallic or a plastic material. A plurality of openings 70 extends through the screen 14. Each of the openings 14 is bounded by four filaments 72, 74. The screen 14 has a density of the openings 70 equal to at least 140 openings per square inch of the screen 14. More particularly, the screen 14 is likely formed of lateral 72 and longitudinal 74 filaments having a density of at least fourteen lateral 72 and fourteen longitudinal 74 filaments per square inch. While the prior art has stated that such a high density restricts airflow through the housing 12, experimentation has shown that this size allows enough flow through of air while restricting a greater number of solids from entering the housing 12. The screen 14 has an upper edge 75, a lower edge 76, a first outer edge 77 and a second outer edge 78.

The screen 14 is positioned between coupled pairs of the female 30 and male 50 mating members to position the first outer edge 77 between one of the coupled pairs (a coupled pair being shown in FIG. 9) and position the second outer edge 78 between another of the coupled pairs. The coupled pairs are adapted to space the screen 14 from the housing 12 adjacent to the coupled pairs. The spacing is due to the female receiver 38 being spaced from the first 34 and second 35 edges and is further encouraged by the first 44 and second 45 outer walls. This allows for much easier installation than attempting to form a complete seal with the screen 14 against the housing 12 as well as prevents the need to overly bend the screen 14 at the edges of the female 30 and male 50 mating members which will stress the screen 14 where it is exposed to the elements and promote mechanical failure thereof.

In use, the screen 14 is positioned on the housing 12 as described above. When material, such as cottonwood seeds for instance, strike the screen, the screen 14 will prevent their passage into the housing 12. Those materials that become adhered to the screen 14 are easily washed off such as with a garden hose. It has been found that the higher density of the filaments also allows for easier removal of material adhered to the screen 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A condenser unit screen system comprising:
   an air condenser housing;
   a pair of female mating members, each of said female mating members comprising;
   an elongated panel having a first side, a second side, a first side edge, a second side edge, a first end and a second end, said elongated panel being elongated from said first end to said second end;
   a female receiver being mounted on said first side and extending from said first end to said second end, said female receiver being spaced from each of said first and second side edges;
   a pair of male mating members, each of said male mating members being removably engageable with one of said female mating members, each of said male mating members comprising;
   an elongated plate having an exposed surface, a hidden surface, a first lateral edge, a second lateral edge, a first terminal edge and a second terminal edge;
   a male coupler being mounted on said hidden surface and being removably extendable into said female receiver of one of said female mating members;
   a plurality of fasteners, each of said female mating members having one of said fasteners coupled thereto, said fasteners releasably coupling said female mating members to said housing; and
   a screen mesh being formed by filaments intersecting each other, a plurality of openings extending through said screen, each of said openings being bounded by four filaments, said screen having a density of said openings equal to at least 140 openings per square inch of said screen, said screen having an upper edge, a lower edge, a first outer edge and a second outer edge, said screen being positioned between coupled pairs of said female and male mating members to position said first outer edge between one of said coupled pairs and position said second outer edge between another of said coupled pairs, said coupled pairs adapted to space said screen from said housing adjacent to said coupled pairs;

each of said female mating members comprises a female receiver being mounted on said first side and extending from said first end to said second end, said female receiver being spaced from each of said first and second side edges, said female receiver being formed by a pair of elongated inner walls being spaced from each other and being spaced from said first and second side edges, a receiving space being defined between said inner walls to receive said male coupler;

each of said inner walls has a distal edge with respect to first side, each of said inner walls having a flange attached thereto and positioned adjacent to a corresponding one of said distal edges, said flanges extending toward each other, said flanges having an outer surface facing away from said first side, said outer surface of each of said flanges being angled downwardly toward said receiving space; and wherein each of said male mating members further comprises;

said male coupler including a base extending from said first terminal end to said second terminal end, a catch being attached to and extending along a length of said base opposite of said plate, said catch engaging associated ones of said flanges to retain said plate in a coupled state with said panel, said catch being positionable between said flanges and said panel.

2. The apparatus according to claim 1, wherein each of said female mating members further comprises:
 a first outer wall being attached to said first side and being coextensive with said first side edge; and
 a second outer wall being attached to said first side and being coextensive with said second side edge, said first and second outer walls being orientated parallel to said inner walls.

3. The apparatus according to claim 1, wherein each of said fasteners comprises:
 a first mating member having an adhesive thereon, said first mating member being attached to said housing with said adhesive;
 a second mating member being adhesively coupled to an associated one of said second sides, said first and second mating members being releasably coupled to each other.

4. The apparatus according to claim 3, wherein said first and second mating members comprise hook and loop couplers.

5. The apparatus according to claim 1, wherein each of said fasteners comprises:
 a first mating member having an adhesive thereon, said first mating member being attached to said housing with said adhesive;
 a second mating member being adhesively coupled to an associated one of said second sides, said first and second mating members being releasably coupled to each other.

6. The apparatus according to claim 3, wherein said first and second mating members comprise hook and loop couplers.

7. A condenser unit screen apparatus to prevent material from blowing into a housing containing a condenser unit, said apparatus comprising:
 a pair of female mating members, each of said female mating members comprising;
  an elongated panel having a first side, a second side, a first side edge, a second side edge, a first end and a second end, said elongated panel being elongated from said first end to said second end;
  a female receiver being mounted on said first side and extending from said first end to said second end, said female receiver being spaced from each of said first and second side edges;
 a pair of male mating members, each of said male mating members being removably engageable with one of said female mating members, each of said male mating members comprising;
  an elongated plate having an exposed surface, a hidden surface, a first lateral edge, a second lateral edge, a first terminal edge and a second terminal edge;
  a male coupler being mounted on said hidden surface and being removably extendable into said female receiver of one of said female mating members;
 a plurality of fasteners, each of said female mating members having one of said fasteners coupled thereto, said fasteners being configured to releasably couple said female mating members to said housing; and
 a screen mesh being formed by filaments intersecting each other, a plurality of openings extending through said screen, each of said openings being bounded by four filaments, said screen having a density of said openings equal to at least 140 openings per square inch of said screen, said screen having an upper edge, a lower edge, a first outer edge and a second outer edge, said screen being positioned between coupled pairs of said female and male mating members to position said first outer edge between one of said coupled pairs and position said second outer edge between another of said coupled pairs, said coupled pairs being adapted to space said screen from the housing adjacent to said coupled pairs;
 each of said female mating members comprising a female receiver being mounted on said first side and extending from said first end to said second end, said female receiver being spaced from each of said first and second side edges, said female receiver being formed by a pair of elongated inner walls being spaced from each other and being spaced from said first and second side edges, a receiving space being defined between said inner walls to receive said male coupler;
 each of said inner walls having a distal edge with respect to first side, each of said inner walls having a flange attached thereto and positioned adjacent to a corresponding one of said distal edges, said flanges extending toward each other, said flanges having an outer surface facing away from said first side, said outer surface of each of said flanges being angled downwardly toward said receiving space; and
 each of said male mating members further comprises;
  said male coupler including a base extending from said first terminal end to said second terminal end, a catch being attached to and extending along a length of said base opposite of said plate, said catch engaging associated ones of said flanges to retain said plate in a coupled state with said panel, said catch having a pyramidal shaped cross-section taken traverse to a longitudinal axis of said catch and extending laterally away in opposite directions from said base, said catch being positionable between said flanges and said panel.

8. The apparatus according to claim 7, wherein each of said female mating members further comprises:
   a first outer wall being attached to said first side and being coextensive with said first side edge; and
   a second outer wall being attached to said first side and being coextensive with said second side edge, said first and second outer walls being orientated parallel to said inner walls.

9. The apparatus according to claim 7, wherein each of said fasteners comprises:
   a first mating member having an adhesive thereon configured to be attached to said housing;
   a second mating member being adhesively coupled to an associated one of said second sides, said first and second mating members being releasably coupled to each other.

10. The apparatus according to claim 9, wherein said first and second mating members comprise hook and loop couplers.

\* \* \* \* \*